(12) United States Patent
Tabushi et al.

(10) Patent No.: US 7,063,809 B2
(45) Date of Patent: Jun. 20, 2006

(54) FLAME-RETARDANT AND ELECTROMAGNETIC INTERFERENCE ATTENUATING THERMOPLASTIC RESIN COMPOSITION

(75) Inventors: Koichi Tabushi, Takatsuki (JP); Bunzou Mori, Takatsuki (JP)

(73) Assignee: Nippon A & L Incorporated, Osaka (JP)

( * ) Notice: Subject to any disclaimer, the term of this patent is extended or adjusted under 35 U.S.C. 154(b) by 300 days.

(21) Appl. No.: 10/415,084

(22) PCT Filed: Oct. 25, 2001

(86) PCT No.: PCT/JP01/09372

§ 371 (c)(1), (2), (4) Date: Apr. 25, 2003

(87) PCT Pub. No.: WO02/34837

PCT Pub. Date: May 2, 2002

(65) Prior Publication Data

US 2004/0012003 A1    Jan. 22, 2004

(30) Foreign Application Priority Data

Oct. 26, 2000  (JP)  .............................. 2000-327235

(51) Int. Cl.
  H01B 1/22   (2006.01)
  H01B 1/24   (2006.01)
  C08K 13/04  (2006.01)
  G21K 1/10   (2006.01)

(52) U.S. Cl. ...................... 252/512; 252/513; 252/514; 252/515; 523/137

(58) Field of Classification Search .............. 252/512, 252/513; 523/137
See application file for complete search history.

(56) References Cited

U.S. PATENT DOCUMENTS

| | | | |
|---|---|---|---|
| 4,107,232 A * | 8/1978 | Haaf et al. ................. | 524/142 |
| 4,914,144 A * | 4/1990 | Muehlbach et al. ......... | 524/139 |
| 5,141,982 A * | 8/1992 | Oku et al. .................. | 524/432 |
| 5,219,907 A * | 6/1993 | Niessner et al. ............ | 524/140 |
| 5,276,256 A * | 1/1994 | Niessner et al. ............ | 525/67 |
| 5,294,654 A | 3/1994 | Hellstern-Burnell et al. | |
| 5,783,620 A * | 7/1998 | Hamashima et al. ........ | 524/405 |
| 6,329,451 B1 * | 12/2001 | Matsumoto et al. ......... | 524/80 |
| 2003/0018134 A1 * | 1/2003 | Kurasawa et al. .......... | 525/132 |

FOREIGN PATENT DOCUMENTS

| | | |
|---|---|---|
| EP | 0 754 531 A1 | 1/1997 |
| JP | 1-139647 A | 6/1989 |
| JP | 2000-129148 A | 5/2000 |
| JP | 2000-297188 A | 10/2000 |
| WO | WO 93/04119 A1 | 3/1993 |
| WO | WO 9738051 A1 * | 10/1997 |

OTHER PUBLICATIONS

Translation of JP 01-139647-A. (Izumi Kosuge) Jun. 1, 1989.*

* cited by examiner

*Primary Examiner*—Matthew A. Thexton
(74) *Attorney, Agent, or Firm*—Sughrue Mion, PLLC

(57) ABSTRACT

A flame-retardant and electromagnetic wave-shielding thermoplastic resin composition is provided, which comprises 100 parts by weight of a thermoplastic resin (A); from 0.5 to 30 parts by weight of a flame retardant of a halogen-free phosphate (B) represented by the following general formula (1):

$$R_1-(O)_k-\overset{\overset{O}{\|}}{\underset{\underset{R_2}{(O)_l}}{P}}-\left[O-X-O-\overset{\overset{O}{\|}}{\underset{\underset{R_3}{(O)_m}}{P}}\right]_N-(O)_n-R_4 \quad (1)$$

wherein $R_1$, $R_2$, $R_3$, and $R_4$ each independently represent a hydrogen atom or a monovalent organic group, at least one of $R_1$, $R_2$, $R_3$, and $R_4$ is a monovalent organic group, X is a bivalent organic group, k, l, m, and n are each independently 0 or 1, and N is an integer of 0 to 10; from 5 to 35 parts by weight of a metal-coated fiber (C); and from 3 to 30 parts by weight of a filler in a scaly shape or an acicular shape (D). Such a composition has excellent flame retardance, good appearance, and excellent molding flowability.

4 Claims, No Drawings

FLAME-RETARDANT AND ELECTROMAGNETIC INTERFERENCE ATTENUATING THERMOPLASTIC RESIN COMPOSITION

TECHNICAL FIELD

The present invention relates to a flame-retardant and electromagnetic wave-shielding thermoplastic resin composition that is excellent in flame retardance and molding flowability.

BACKGROUND ART

Styrene resins, which are manufactured and commercially available under the name of HIPS, ABS etc., are excellent in appearance, mechanical properties and molding flowability, and therefore used in various fields such as vehicle components, electrical appliances, miscellaneous goods, etc.

Since these styrene resins are thermoplastic materials, however, the use of them is restricted in electrical and electronic equipment that is required to have flame retardance such as the self-extinguishing properties (V-0, V-1, and V-2 classes) according to U.S. Underwriters Laboratories (UL) Standard 94.

The flame retardance is provided by using halide compounds such as tetrabromobisphenol A (TBBA) and decabromodiphenylether (DBDE), a combination of halides and antimony compounds, or various phosphorous compounds.

Although the addition of these compounds can provide the flame retardance, an increase in the used amount of such expensive fire retardants leads to not only an increase in cost but also a significant deterioration in the physical properties such as impact resistance, which is one of the distinctive properties of the styrene resins. In addition, antimony trioxide, which is used in combination of the halide compounds, is a material of concern about environmental pollution. Therefore, some cases require the flame-retardant resin materials to be free of the antimony compound.

In some uses of the flame-retardant resin materials, such as household electrical appliances, OA, and electrical and electronic equipment, some components are required to have an electromagnetic wave-shielding property (EMI shielding property). In most of such uses, the resin materials are subjected to a secondary process such as plating, conductive coating, or the like, before used. Some electromagnetic wave-shielding thermoplastic resins are commercially available, including thermoplastic resins that contain the additive for increasing electrical conductivity, such as carbon fiber, carbon black, and stainless steel fiber. However, no thermoplastic resin is available to satisfy all of flame retardance, electromagnetic wave-shielding stability, and good molding appearance.

The present invention has been made to solve the above problems. It is therefore an object of the present invention to provide a flame-retardant and electromagnetic wave-shielding, thermoplastic resin composition that has excellent flame retardance, good appearance, and excellent molding flowability.

The inventors have made active investigations in light of the above problems and have found that the use of a specific flame retardant, a metal-coated fiber, and a specifically shaped filler in a specific amount range of composition can provide a flame-retardant and electromagnetic wave-shielding, thermoplastic resin composition with excellent flame retardance, good appearance, and excellent molding flowability, and have finally made the present invention.

DISCLOSURE OF THE INVENTION

Thus, the present invention is directed to a flame-retardant and electromagnetic wave-shielding thermoplastic resin composition comprising:

(A) 100 parts by weight of a thermoplastic resin;

(B) 0.5 to 30 parts by weight of a flame retardant of a halogen-free phosphate ester represented by the following general formula (1):

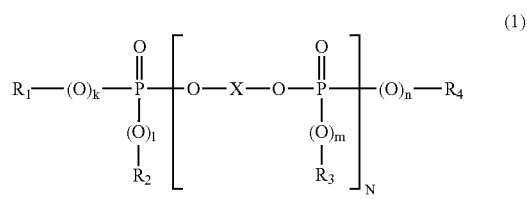

wherein $R_1$, $R_2$, $R_3$, and $R_4$ each independently represent a hydrogen atom or a monovalent organic group, at least one of $R_1$, $R_2$, $R_3$, and $R_4$ is a monovalent organic group, X is a bivalent organic group, k, l, m, and n are each independently 0 or 1, and N is an integer of from 0 to 10;

(C) 5 to 35 parts by weight of a metal-coated fiber; and (D) 3 to 30 parts by weight of a filler in a scaly shape or an acicular shape.

The flame-retardant and electromagnetic wave-shielding thermoplastic resin composition of the present invention is described in detail in the following.

Examples of the thermoplastic resin used in the present invention include styrene resin such as polystyrene, AS resin, MS resin, HIPS resin, ABS resin, AES resin, AAS resin, and MBS resin; polycarbonate resin; polybutyleneterephthalate resin; polyethyleneterephthalate resin; polyamide resin; polyethylene resin; polypropylene resin; polyphenylenether resin; polyphenylenesulfide resin; and polyoxymethylene resin. Among these resins, the styrene resins or a mixture of the styrene resin and any of the other thermoplastic resins is particularly preferred. The content of the styrene resin in the thermoplastic resin (A) is preferably 10 to 100% by weight. In particular, a preferred styrene resin is a rubber-reinforced styrene type resin such as ABS resin, AES resin, AAS resin, and MBS resin.

In the general formula (1) representing the halogen-free phosphate of the flame retardant (B) used for the present invention, the monovalent organic group may include an optionally substituted alkyl group, an optionally substituted aryl group, and an optionally substituted cycloalkyl group. Examples of the substituent in the substituted group include an alkyl group, an alkoxy group, an alkylthio group, an aryl group, an aryloxy group, and an arylthio group, and the substituent may also be any combination of these groups (such as an arylalkoxyalkyl group) or any combination of these groups in which the groups are combined through an atom such as oxygen, sulfur, or nitrogen (such as an arylsulfonylaryl group). Examples of the bivalent organic group include an alkylene group, an optionally substituted phenylene group, and the groups derived from polyhydric phenols or polynuclear phenols (such as bisphenols). Particularly preferred examples of the bivalent organic group include hydroquinone, resorcinol, diphenylol methane, diphenylol dimethylmethane, dihydroxydiphenyl, p,p'-dihydroxydiphenylsulfone, and dihydroxynaphthalene. One or more thereof may be used.

Examples of the flame retardant of the halogen-free phosphate (B) include trimethyl phosphate, triethyl phosphate, tripropyl phosphate, tributyl phosphate, tripentyl phosphate, trihexyl phosphate, tricyclohexyl phosphate, trioctyl phosphate, triphenyl phosphate, tricresyl phosphate, trixylenyl phosphate, hydroxyphenyldiphenyl phosphate, cresyldiphenyl phosphate, xylenyldiphenyl phosphate, and the compound represented by the following formula (2), (3), or (4).

halogenated flame retardant such as TBBA and a halogenated triazine compound, or a flameproofing agent such as an antimony compound may be added, though the added amount of the halogenated flame retardant and the antimony compound should be as small as possible.

Examples of the metal-coated fiber (C) include nickel-coated carbon fiber and nickel-coated glass fiber. The nickel-coated carbon fiber is particularly preferred. In the present invention, as far as the effect is not deteriorated, conventional carbon fiber, glass fiber, or the like maybe added together with the metal-coated fiber. The amount ratio of the

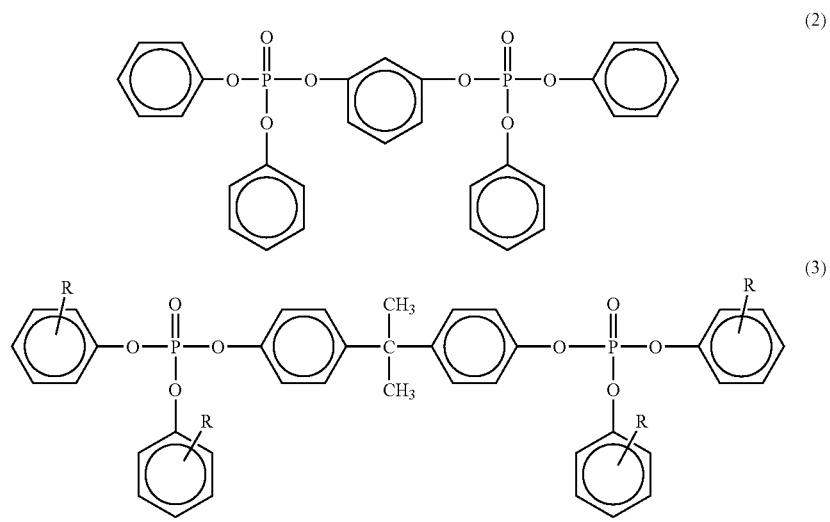

wherein R represents hydrogen or a methyl group.

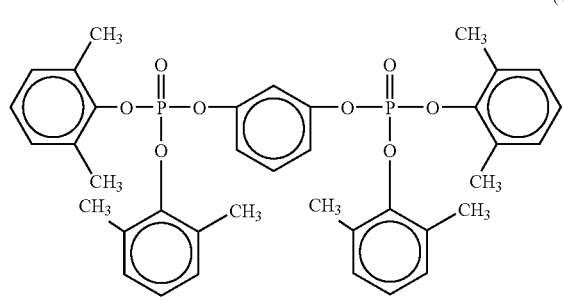

The amount ratio of the flame retardant of the halogen-free phosphate (B) is from 0.5 to 30 parts by weight based on 100 parts by weight of the thermoplastic resin (A). When a ratio is less than 0.5 parts by weight, no sufficient flame retardance can be obtained. A ratio is more than 30 parts by weight is not preferred, because such a ratio leads to a decrease in heat resistance and impact resistance.

In the present invention, the flame retardant of the phosphate represented by the formula (1) is used to achieve the desired effect. As far as the effect of the present invention is not deteriorated, however, a halogen-free flame retardant other than the phosphate, such as melamine cyanurate, a phosphazene derivative, and ammonium polyphosphate; a metal-coated fiber (C) is from 5 to 35 parts by weight based on 100 parts by weight of the thermoplastic resin (A). When a ratio is less than 5 parts by weight, the electrical conductivity is not enough to develop the electromagnetic wave-shielding property. A ratio more than 35 parts by weight is not preferred, because such a ratio leads to a reduction in molding flowability and impact resistance, and a deterioration in molding appearance.

Examples of the filler (D) in the scaly shape or the acicular shape used in the present invention include talc, mica, glass flake, graphite (in the scaly shape), and a whisker (in the acicular shape) of potassium titanate, magnesium oxysulfate, aluminum borate, wollastonite, acicular calcium carbonate, zinc oxide, silicon carbide, or silicon nitride. Of these materials, zincoxide whisker is particularly preferred. The amount ratio of the component (D) is from 3 to 30 parts by weight based on 100 parts by weight of the thermoplastic resin (A). A ratio less than 3 parts by weight leads to a deterioration in molding appearance and a reduction in electromagnetic wave-shielding stability. A ratio more than 30 parts by weight is not preferred, because such a ratio leads to a reduction in molding flowability and impact resistance.

In the present invention, polytetrafluoroethylene (E) is also preferably used in addition to the above (A), (B), (C), and (D) components to enhance the flame-retardant effect. The polytetrafluoroethylene (E) is a fluoro-polymer formed by the polymerization of the main component of tetrafluoroethylene, for example, including commercially available POLYFLON (trade name) manufactured by DAIKIN INDUSTRIES, LTD., Teflon® manufactured by Du Pont-Mitsui Fluorochemicals Co., LTD., and Hostaflon® manufactured by Hoechst AG. The polytetrafluoroethylene (E) is preferably used in the range of 0.05 to 5 parts by weight based on 100 parts by weight of the thermoplastic resin (A).

In the present invention, any process may be used without limit for mixing the components, and an extruder, a Banbury mixer, a roller, a kneader, or the like can be used for mixing.

The resin composition of the present invention may optionally contain a known additive such as an antioxidant such as 2,6-di-t-butyl-4-methylphenol, 2-(1-methylcyclohexyl)-4,6-dimethylphenol, 2,2-methylenebis-(4-ethyl-6-t-methylphenol), 4,4'-thiobis-(6-t-butyl-3-methylphenol), dilaurylthiodipropionate, and tris (di-nonylphenyl)phosphite; an ultraviolet absorbing agent such as p-t-butylphenyl salicylate, 2,2'-dihydroxy-4-methoxybenzophenone, and 2-(2'-hydroxy-4'-n-octoxyphenyl)benzotriazole; a lubricant such as paraffin wax, stearic acid, hardened oil, stearoamide, methylenebis(stearoamide), ethylenebis(stearoamide), n-butylstearate, ketonewax, octylalcohol, laurylalcohol, and hydroxystearic acid triglyceride; a coloring agent such as titanium oxide and carbon black; and a filler such as calcium carbonate, clay, silica, glass fiber, glass bead, and carbon fiber.

The above-described resin composition of the present invention may be formed into a molding product with an excellent flame retardance and an excellent electromagnetic wave-shielding property by a known molding method such as injection molding, compression molding, extrusion molding, and injection compression molding. The resultant molding product can be used in the field demanding flame retardance and electromagnetic wave-shielding property, for example, as a component or a housing component of an electrical or electronic device.

EXAMPLES

The present invention is further described in detail by showing Examples in the following, but such Examples are not intended to restrict the scope of the present invention. In Examples, "parts" or "%" is by weight, unless otherwise specified.

In the following, Examples and Comparative Examples are shown for the purpose of illustrating the present invention, but such Examples are not intended to restrict the scope of the present invention. The following methods were carried out for the evaluation of the products related to the present invention.

Molding Flowability:

The melt flow rate was measured according to ASTM D-1238 at 220° C.×10 kg, units: g/10 min.

Impact Resistance:

The impact strength was measured without notch according to ASTM D-256 with ¼ inch, units: J/m.

Flame Retardance:

The flame retardance (self-extinguishing property) was measured with each test piece 1.6 mm in thickness according to UL 94.

Electromagnetic Wave (EMI) Shielding Property:

Flat-shaped test pieces, each 150 mm long, 100 mm wide, and 3 mm thick, were prepared by injection molding, and a center portion, 50 mm×50 mm, was cut out of each of the prepared pieces to form a test piece for measurement. The volume resistance (electrical conductivity) was measured in units of Ω·cm to evaluate the electromagnetic wave-shielding property.

Molding Appearance:

Flat-shaped test pieces, each 150 mm long, 100 mm wide, and 3 mm thick, were prepared by injection molding, and the appearance thereof was visually observed.

◯: There is neither flow mark in the resin nor floating of the metal fiber.

Δ: There is either flow mark in the resin or floating of the metal fiber.

X: There are both flow mark in the resin and floating of the metal fiber.

Thermoplastic Resin (A)

A-1: ABS Resin (KRALASTIC® GA-501 manufactured by NIPPON A&L INC.)

A-2: Mixture of the above ABS Resin and Polycarbonate Resin (CALIBRE 200-20 manufactured by Sumitomo Dow Limited.) at a ratio of 80 to 20 by weight.

A-3: PA/ABS Resin Alloy (TECHNIACE® TA-1500 manufactured by NIPPON A&L INC.)

Phosphate Flame Retardant (B)

B-1: Compound Represented by Formula (2) (CR-733S manufactured by DAIHACHI CHEMICAL INDUSTRY CO., LTD.)

B-2: Compound Represented by Formula (4) (PX-200 manufactured by DAIHACHI CHEMICAL INDUSTRY CO., LTD.)

B-i: Tetrabromobisphenol A

B-ii: Antimony Trioxide

B-iii: Phenoxyphosphazene (CP-134H manufactured by Chemipro Kasei Kaisha, Ltd.)

Metal-Coated Fiber (C)

C-1: Nickel-Coated Carbon Fiber (Besfight MCHTA-C6-US manufactured by Toho Rayon Ltd.)

C-i: Carbon Fiber (Besfight HTA-C6-SR manufactured by Toho Rayon Ltd.)

Filler (D)

D-1: Zinc Oxide Whisker (Pana-Tetra manufactured by Matsushita AMTEC Co., Ltd.)

Polytetrafluoroethylene (E)

E-1: PTFE (POLYFLON FA-500 manufactured by DAIKIN INDUSTRIES, LTD.)

Examples 1 to 45 and Comparative Examples 1 to 7

The above components (A) to (E) were mixed in each ratio as shown in Table 1, and the mixture was melted and kneaded with a biaxial extruder, resulting in a pellet. The resulting pellet was formed into each test piece with an injection molder, and then each evaluation was carried out. The results are shown in Table 1.

TABLE 1

| | Example 1 | Example 2 | Example 3 | Example 4 | Example 5 | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|---|---|---|
| Composition | | | | | | | | | | | | |
| A-1 | 100 | | 100 | | 100 | 100 | 100 | | | 100 | | |
| A-2 | | 100 | | | | | | 100 | 100 | | 100 | 100 |
| A-3 | | | | 100 | | | | | | | | |
| B-1 | 3 | | 12 | | 3 | | 3 | | 0.1 | | 3 | |
| B-2 | | 12 | | 15 | | | | 12 | | 50 | | 12 |
| B-i | 15 | | | | | | 15 | | 20 | | | |
| B-ii | 5 | | | | | | 5 | | | | | |
| B-iii | | | | | 20 | | | | | | | |
| C-1 | 10 | 20 | 15 | 15 | 15 | 10 | 1 | 15 | 15 | 10 | 50 | |
| C-i | | | | | | | | | | | | 20 |
| D-1 | 5 | 10 | 10 | 10 | 5 | 5 | 10 | 1 | 10 | 5 | 10 | 10 |
| E-1 | 0.3 | | | | | 0.3 | 0.3 | | | 0.3 | | |
| Physical Properties | | | | | | | | | | | | |
| Molding flowability (g/10 min) | 40 | 25 | 40 | 24 | 30 | 10 | 50 | 33 | 8 | 100 | 3 | 17 |
| Impact Resistance (J/m) | 147 | 245 | 143 | 255 | 150 | 196 | 275 | 294 | 98 | 35 | 39 | 210 |
| Flame Retardance | V-0 | V-0 | V-2 | V-0 | V-0 | HB | V-0 | V-0 | HB | HB | HB | V-0 |
| Electromagnetic Wave-Shielding Property (Ω·cm) | 15 | 1 | 10 | 3 | 12 | 10 | 1000< | 150 | 5 | 120 | 1 | 140 |
| Molding Appearance | ○ | ○ | ○ | ○ | ○ | ○ | ○ | x | Δ | ○ | x | Δ |

As described above, the flame-retardant and electromagnetic wave-shielding thermoplastic resin composition of the present invention can have excellent flame retardance, good appearance, and excellent molding flowability, and therefore can appropriately be used in the field demanding flame retardance and electromagnetic wave-shielding property, such as household electrical appliances, OA devices, and electrical or electronic devices.

The invention claimed is:

1. A flame-retardant and electromagnetic wave-shielding thermoplastic resin composition, comprising:
   100 parts by weight of a thermoplastic resin (A);
   from 0.5 to 30 parts by weight of a flame retardant of a halogen-free phosphate (B) represented by the following general formula (1):

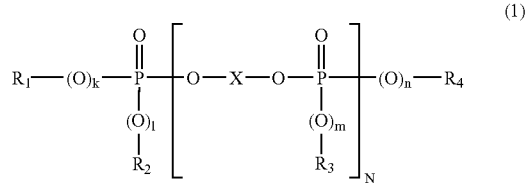

(1)

wherein $R_1$, $R_2$, $R_3$, and $R_4$ each independently represent a hydrogen atom or a monovalent organic group, at least one of $R_1$, $R_2$, $R_3$, and $R_4$ is a monovalent organic group, X is a bivalent organic group, k, l, m, and n are each independently 0 or 1, and N is an integer of 0 to 10;

from 5 to 35 parts by weight of a metal-coated fiber (C);

from 3 to 30 parts by weight of a filler in a scaly shape or an acicular shape (D), and from 0.05 to 5 parts by weight of polytetrafluoroethylene (E), wherein the thermoplastic resin (A) comprises a styrene resin or a styrene resin and a second thermoplastic resin, wherein the styrene resin is an ABS resin, an AES resin, an AAS resin or an MBS resin;

the second thermoplastic resin is a polycarbonate resin or a polyamide resin; and the component (D) is a zinc oxide whisker.

2. A molding product formed of the resin composition according to claim 1.

3. The molding product according to claim 2, wherein the product has a volume resistance value of at most 100 Ω·cm.

4. A component or housing component product of an electrical or electronic device, comprising the molding product according to claim 2.

* * * * *